US010458607B2

(12) United States Patent
Wentworth et al.

(10) Patent No.: US 10,458,607 B2
(45) Date of Patent: Oct. 29, 2019

(54) LIGHTING DEVICE FOR A COMPONENT OF A VEHICLE WASH SYSTEM

(71) Applicant: Motor City Wash Works, Inc., Wixom, MI (US)

(72) Inventors: Robert Wentworth, Farmington Hills, MI (US); Michel M. Lecourt, Westland, MI (US); Douglas J. Calvin, Livonia, MI (US); Jeffrey K. Underhill, Northville, MI (US); Kenneth A. McPherson, Ann Arbor, MI (US)

(73) Assignee: Motor City Washworks, Inc., Wixom, MI (US)

( * ) Notice: Subject to any disclaimer, the term of this patent is extended or adjusted under 35 U.S.C. 154(b) by 0 days.

(21) Appl. No.: 16/120,892

(22) Filed: Sep. 4, 2018

(65) Prior Publication Data

US 2019/0072247 A1 Mar. 7, 2019

Related U.S. Application Data

(60) Provisional application No. 62/553,793, filed on Sep. 1, 2017.

(51) Int. Cl.
*F21S 4/28* (2016.01)
*F21V 19/00* (2006.01)
(Continued)

(52) U.S. Cl.
CPC ............. *F21S 4/28* (2016.01); *F21S 8/032* (2013.01); *F21V 17/164* (2013.01); *F21V 19/004* (2013.01); *F21V 31/00* (2013.01); *B60S 3/04* (2013.01); *B60S 3/06* (2013.01); *F21W 2131/40* (2013.01); *F21Y 2115/10* (2016.08)

(58) Field of Classification Search
CPC ....... B60S 3/04; B60S 3/06; F21S 4/28; F21S 8/032; F21S 4/20; F21S 6/004; F21S 8/086; F21V 17/164; F21V 19/004; F21V 31/00; F21V 21/025; F21V 21/02;
(Continued)

(56) References Cited

U.S. PATENT DOCUMENTS

7,311,423 B2 * 12/2007 Frecska ............... F21S 8/04
362/150
8,322,882 B2 * 12/2012 Ward ............... H01L 24/97
362/249.02
(Continued)

*Primary Examiner* — Peggy A Neils
(74) *Attorney, Agent, or Firm* — Quinn IP Law (57) ABSTRACT

A lighting device is provided for attachment to a component that defines an open area. The lighting device includes a mounting plate and a light emitting diode (LED) assembly. The mounting plate extends longitudinally, and is disposable within the open area. The mounting plate presents a first mounting surface and a second mounting surface. The LED assembly is operatively attached to the first mounting surface, with the LEDs being operatively attached to the first mounting surface, such that the LEDS form at least two columns. Each LED is configured to emit a respective field of light in response to being energized. The LED assembly is configured such that a field of light projected from the LEDs for one of the at least two columns is projected radially away from the field of light projected from the LEDs for the other of the at least two columns.

16 Claims, 8 Drawing Sheets

(51) Int. Cl.
*F21V 17/16* (2006.01)
*F21V 31/00* (2006.01)
*F21S 8/00* (2006.01)
*F21W 131/40* (2006.01)
*B60S 3/04* (2006.01)
*F21Y 115/10* (2016.01)
*B60S 3/06* (2006.01)

(58) Field of Classification Search
CPC ............. F21W 2131/40; F21Y 2115/10; F21Y 2107/70; F21Y 2103/10
See application file for complete search history.

(56) References Cited

U.S. PATENT DOCUMENTS

| | | | |
|---|---|---|---|
| 8,539,968 B2* | 9/2013 | Tumer | B60S 3/04 134/113 |
| 8,602,041 B2* | 12/2013 | Tumer | B60S 3/04 134/113 |
| 8,643,043 B2* | 2/2014 | Shimizu | F21S 8/04 257/88 |
| 8,819,887 B2* | 9/2014 | Belanger | A46B 13/001 15/179 |
| 8,845,132 B2* | 9/2014 | Flaherty | H05B 33/0803 362/249.03 |
| 2014/0076366 A1* | 3/2014 | Belanger | B60S 3/04 134/34 |

* cited by examiner

LIGHTING DEVICE FOR A COMPONENT OF A VEHICLE WASH SYSTEM

CROSS-REFERENCE TO RELATED APPLICATIONS

This application claims the benefit of U.S. Provisional Patent Application Ser. No. 62/553,793, filed on Sep. 1, 2017, which is incorporated by reference in its entirety herein.

TECHNICAL FIELD

The present disclosure relates to a lighting device for a component of a vehicle wash system.

BACKGROUND OF THE DISCLOSURE

Wash systems for vehicles include one or more treatment devices. The treatment devices may include a cloth roll, a top wheel, a rinse manifold, a friction curtain, a dryer, and the like. The treatment devices may be arranged as a wash system in a wash facility to collectively clean exterior surfaces of vehicles travelling therethrough.

SUMMARY

One aspect of disclosure provides a lighting device for attachment to a component that defines an open area. The lighting device includes a mounting plate and a light emitting diode (LED) assembly. The mounting plate extends longitudinally, and is configured to be operatively disposed within the open area. The mounting plate presents a first mounting surface and a second mounting surface, opposite the first mounting surface. The LED assembly is operatively attached to the first mounting surface. The LEDs are operatively attached to the first mounting surface of the mounting plate, such that the plurality of LEDS form at least two columns. Each LED is configured to emit a respective field of light in response to being energized. The LED assembly is configured such that a field of light projected from the plurality of LEDs for one of the at least two columns is projected radially away from the field of light projected from the other of the at least two columns.

Another aspect of the disclosure provides a component for a vehicle wash system, the component includes a pair of support members and a lighting device. The pair of support members operatively extend longitudinally, in spaced relationship to one another, such that an area is defined therebetween. The lighting device is operatively disposed in the area defined between the pair of support members. The lighting device includes a mounting plate and an LED assembly. The mounting plate presents a first mounting surface and a second mounting surface, opposite the first mounting surface. The LED assembly is operatively attached to the first mounting surface and includes a plurality of LEDs. The LEDs are operatively attached to the first mounting surface of the mounting plate, such that the plurality of LEDs form at least two columns. Each LED is configured to emit a respective field of light in response to being energized. The LED assembly is configured such that a field of light projected from the LEDs for one of the at least two columns is projected radially away from the field of light projected for the other of the at least two columns.

Yet another aspect of the disclosure provides a retrofit kit for a component including a pair of support members that define an open area therebetween. The retrofit kit includes a mounting plate and an LED assembly. The mounting plate extends longitudinally, and is configured to be operatively disposed within the open area. The mounting plate presents a first mounting surface and a second mounting surface, opposite the first mounting surface. The LED assembly is operatively attachable to the first mounting surface. The LED assembly includes a plurality of LEDs. The LED assembly is configured to be operatively attached to the mounting plate, such the LED assembly is disposable on the mounting plate, such that the LEDs form at least two columns. Each LED is configured to emit a respective field of light in response to being energized. The LED assembly is configured such that a field of light projected from the LEDs for one of the at least two columns is projected radially away from the field of light projected from the LEDs for the other of the at least two columns.

These and other features and advantages of the present disclosure will become apparent to one of ordinary skill in the art from the following description of the disclosure, when viewed in accordance with the accompanying drawings and appended claims.

DETAILED DESCRIPTION OF THE DISCLOSURE

Referring to the Figures, the present disclosure is intended for use in a vehicle washing system 20, as will be understood by one of ordinary skill in the art. It will also be understood by one of ordinary skill in the art, that the present disclosure can be utilized in a variety of other applications.

Referring to the Figures, wherein like numerals indicate corresponding parts throughout the several views, a vehicle wash system 20 is generally shown.

The vehicle wash system 20 includes a plurality of components 21, including, but not limited to, light posts, stand-alone light displays, vehicle treatment components, and the like. The vehicle treatment components may be those treatment components in a vehicle car wash facility, such as, a cloth roll, a top wheel, a rinse manifold, a friction curtain, a dryer, and the like. The vehicle wash system 20 may include other vehicle components 21. Each of the components 21 may be operatively supported by a plurality of support members 22. The support members 22 may be subjected to various fluids, such as water and chemicals, as well as dirt and debris, during a vehicle cleaning process. The support members 22 of each of these components 21 may be constructed of a base material, such as a metal, which may be corrosive. However, the base material of the support members 22 may be formed of other materials, as known to those of skill in the art. In many instances, the support members 22 are unpainted or painted a particular color. Some components 21 may include a plurality of support members 22 that are spaced apart. It will be appreciated that the support members may be any desired shape.

As will be explained in further detail, light assemblies 49 may be operatively attached to the vehicle components 21. Such lighting assemblies 49 include a plurality of light emitting diodes (LEDs) 60 that are each selectively illuminable to provide a desired lighting display and animation. The LEDs 60 may be illuminated in any desired color, as well. Projection of the lights from such lighting assemblies 49 may be visible to potential customers outside of a vehicle wash facility and/or provide excitement to customers having their vehicle washed in such a facility. Further, LEDs 60 are energy efficient, have rapid cycle times, and have a long lifespan before burning out.

One or more skins, shells, or covers, i.e., cover member 28, may cover and protect each support member 22 to prevent corrosion, to facilitate cleaning, and to improve aesthetics. For purposes of illustration, a plurality of generic support members, identified by reference number 22, are shown and described. However, it should be appreciated that the present disclosure applies equally to the support members 22 for any vehicle treatment devices in a vehicle washing system. The present disclosure may also be used for other structures in a vehicle wash facility, such as signs or the like. It will also be understood that the present disclosure may be utilized for other applications besides vehicle washing processes.

As illustrated in FIGS. 3, 4, and 6A-6D, the support members 22 are elongated and present an exterior surface 24 that extends longitudinally between an upper support end 26A and a lower support end 26B, and extends in a latitudinal direction, from a first support edge 50A to a second support edge 50B. Further, referring specifically to FIGS. 4 and 5, each support member 22 may define a first groove 29A proximate the first support edge 50A and a second groove 29B proximate the second support edge 50B. In accordance with the present disclosure, a cover member or skin 28 includes an interior surface 34 and an exterior surface 24. The cover member 28 extends between an upper cover end 27A and a lower cover end 27B. The cover member 28 may be constructed of readably cleanable material, such as a plastic and the like. The cover member 28 may be flexible to assist in its application to the exterior surface 24 of the corresponding support member 22, as discussed in more detail below. However, it will be understood that the cover member 28 may be formed of a variety of other suitable materials, including, but not limited to a material that shrinks upon the application of heat thereto, such that the shrunken material conforms to an exterior surface of the corresponding support member 22. The cover member 28 has a color, which may be any suitable color and/or design to meet an operator's needs and provide aesthetics to a customer. For example, an operator of a car wash facility may desire certain colors for branding and marketing purposes.

The cover member 28 may be readably engageable with and releasable from an outer surface 25 of a respective support member 22 in order to protect the support member 22 from corrosion as well as to preserve the aesthetics of the support members 22. The cover member 28 extends longitudinally from the upper cover end 27A to the lower cover end 27B and extends latitudinally (i.e., laterally) from a first side or edge 32 to a second side or edge 34 to define a hollow channel or interior 36. The interior surface 30 of the cover member 28 is disposed in facing relationship to an outer surface 25 of the support member 22 to protect the support member 22. The cover member 28 is illustrated as having a generally "C"-shaped configuration to match the outer surface 25 of the corresponding support member 22. However, it should be appreciated that the cover member 28 may be generally sized and shaped to match the shaped and dimensions of the outer surface 25 of the respective support member 22. It should be appreciated that the cover member 28 may have a different shape than the outer surface 25 of the respective support member 22, so long as the cover member 28 overlaps or covers the outer surface 25 of the support member 22. The cover member 28 may be configured to cover more or less than the entirety of outer surface 25 of the support member 22, as desired.

The cover member 28 may include a quick release mechanism that allows the cover member 28 to be removably attached to the support member 22. In one embodiment, the cover member 28 may include one or more longitudinally extending support lips 38 that extend radially inward from the interior surface 30 thereof. Each of support lip 38 may be disposed adjacent a respective first edge 32 and second edge 34. Each support lip 38 may be configured to allow the cover member 28 to snap onto the support member 22, such that the cover member 28 is attached to the respective support member 22.

Likewise, each support lip 38 may be configured such that the cover member 28 may selectively detached from the respective support member 22. The cover member 28 may be removably attached to the support member 22 in order to facilitate replacement of the old cover member 28 with a new cover member 28 having a new shell color, pattern, one that is free of blemishes or dirt, and the like. It should be understood by one of ordinary skill in the art that the cover member 28 may be removably attachable to the support member 22 in a variety of different ways, and that a variety of other suitable quick release mechanisms may be employed to allow for a quick and easy releasable attachment of the cover member 28 with the support member 22. It should also be appreciated that other fastening mechanisms, such as bolt-on fasteners, may also be used, as known to those of skill in the art.

Figure 4:
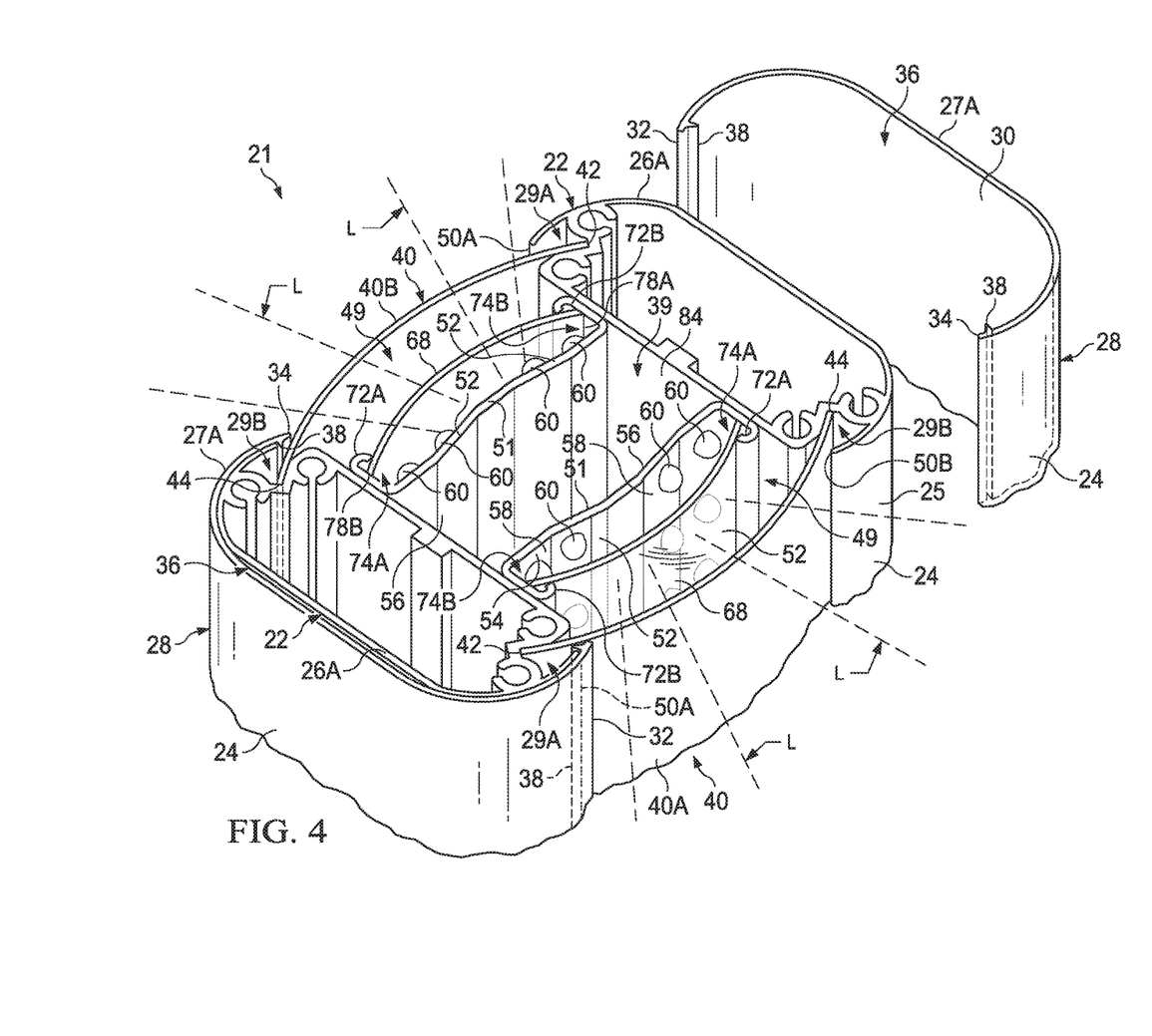
FIG. 4 is a partial perspective and exploded view of another pair of support members and cover members, with a pair of panel members enclosing an area between the support members, and a pair of lighting devices enclosed between the panel members.
Figure 5:
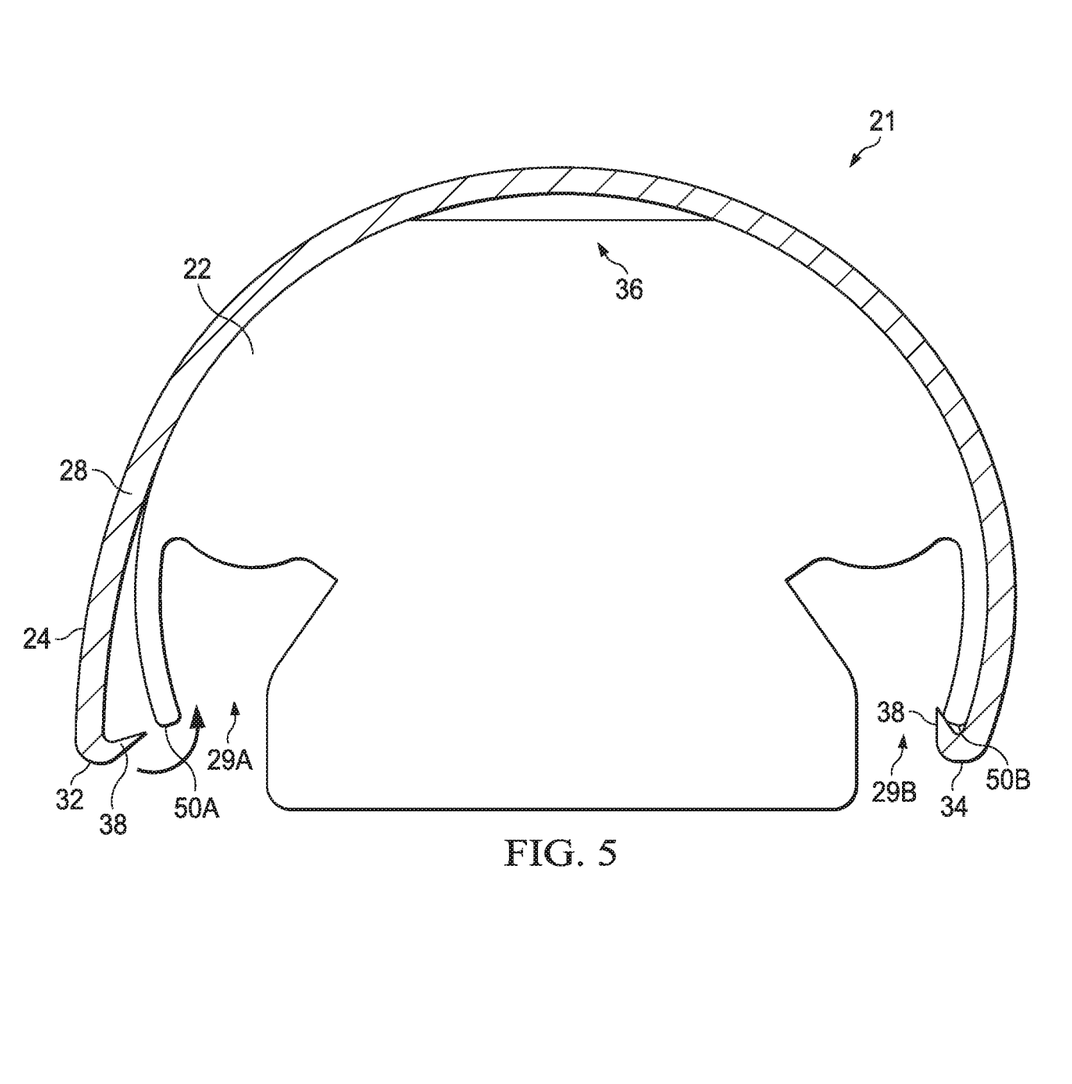
FIG. 5 is a cross sectional end view of an exemplary support member with a respective exemplary cover member attached thereto.

As shown in FIG. 4, two or more support members 22 may be disposed in spaced relationship to one another, such that an area 39 is defined therebetween. It may also be desirable to protect or otherwise disguise the area 39 between two or more spaced apart support members 22. The area 39 may house various system controls, wires, or other similar structures, which may be hidden from view. As shown in FIGS. 4 and 6D, a panel member 40 having a first panel edge 42 and a second panel edge 44 extends between and protects the area 39 defined between a pair of spaced apart support members 22. The panel member 40 may be generally flat, and may constructed of a readably cleanable material. The panel member 40 may be formed with any desired color or texture, such as the color and/or texture to match the respective cover members 28. Alternatively, the panel member 40 may be formed of a contrasting color and/or a different material or texture of the respective cover members 28. Each panel material 40 may be formed from plastic, but may be any suitable material known in the art. The panel member 40 may be flexible and/or resilient.

With continued reference to FIGS. 4 and 6D, the panel member 40 is readably engageable with the respective support members 22 to protect the area 39 therebetween. The first panel edge 42 is configured to engage the first groove 29A, proximate the first support edge 50A of one support member 22, and engage the second groove 29B, proximate the second support edge 50B, of another support member 22. The flexibility of the panel member 40 allows the cover member 28 to be flexible. The flexibility not only aids in attaching the panel member 40 to the respective support members 22, but the flexibility or resilience also allows the panel member 40 to bow and bend, as desired.

With continuing reference to FIGS. 4 and 6D, the panel member 40 extends between the pair of spaced apart support members 22 to cover one side of the area 39 defined between the support members. Referring specifically to FIG. 4, a second panel member 40 may be disposed between the support members 22 to cover a second side of the area 39 between the members 22. This allows the area 39 to be completely covered to protect anything disposed within the area. The panel members 40 can be easily engaged with and removed from the first and second grooves 29A, 29B of the respective support members 22. This selective removal allows replacement of the existing panel member 40 with a new panel member 40 having any desired color and/or texture. Typically, for aesthetics, the panel color is the same color as the skin, and the readably cleanable panel material is the same material as the readably cleanable skin material.

At least one lighting device 49 may be operatively disposed in the area 39 defined between the pair of support members 22. The lighting device 49 includes a mounting plate 51 and an LED assembly 52. The mounting plate 51 extends longitudinally and presents a first mounting surface 54 and a second mounting surface 56, opposite the first mounting surface 54. The LED assembly 52 may be operatively attached to a controller 53 and/or a power source, via wiring.

With reference to FIG. 4, the LED assembly 52 includes a circuit board 58 and a plurality of light emitting diodes 60 (LEDs). The LED assembly 52 is operatively attached to the first mounting surface 54 of the mounting plate 51. Each LED 60 is configured to emit a respective field of light L in response to being energized.

The LEDs 60 are operatively disposed on the circuit board 58. The LED assembly 52 is operatively attached to the mounting plate 51 such that the LED assembly 52 is disposed on the first mounting surface 54 of the mounting plate 51. An adhesive material is operatively disposed between the first mounting surface 54 of the mounting plate 51 and the circuit board 58 (LED assembly 52) to adhesively attach the circuit board 58 (LED assembly 52) to the mounting plate 51. The circuit board may be flexible, thus allowing the LED assembly 52 to be attached to surfaces having different contours.

Figure 1A:
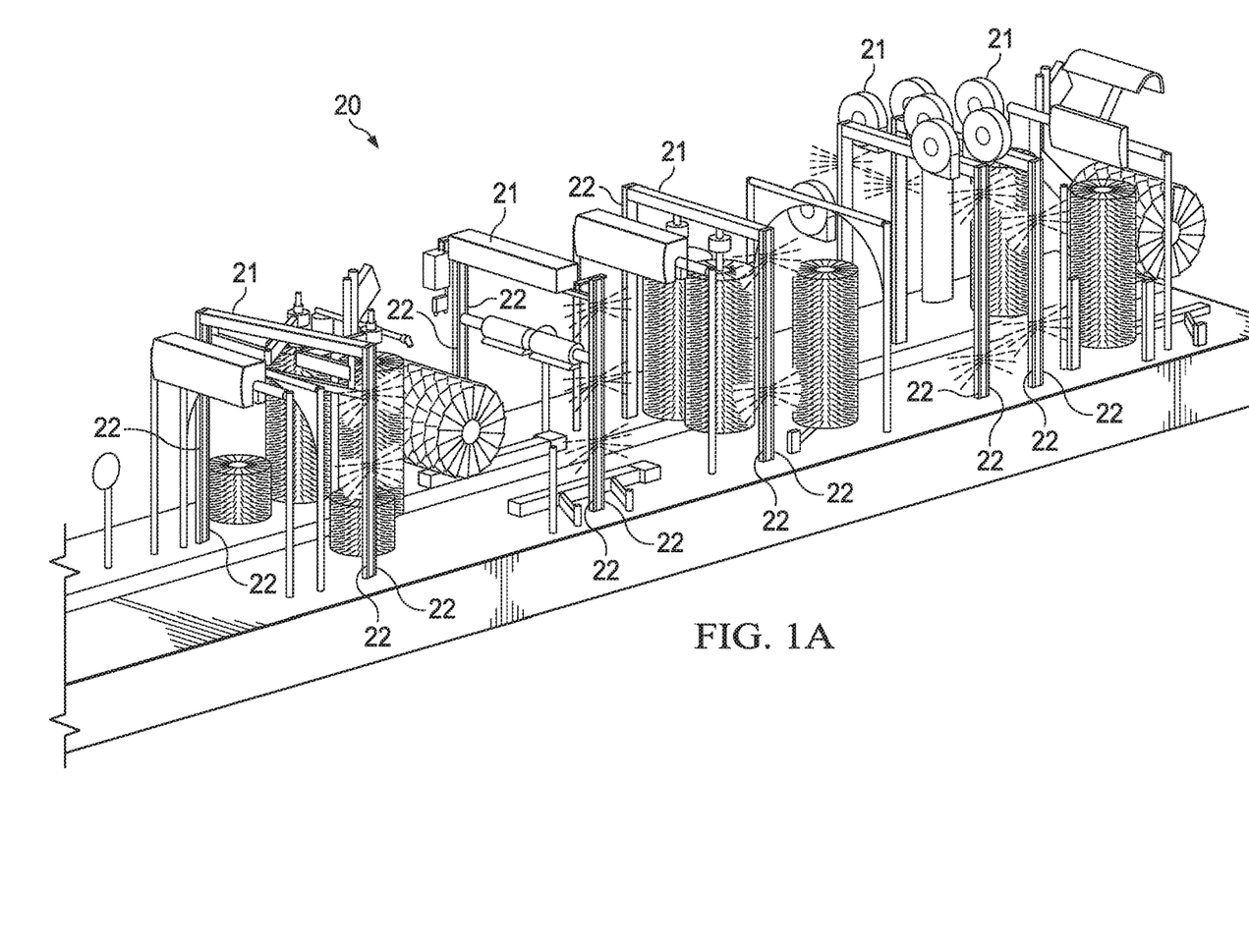
FIG. 1A is a partial schematic perspective view of a vehicle wash system, including a plurality of components having at least one lighting device disposed therein.
Figure 1B:
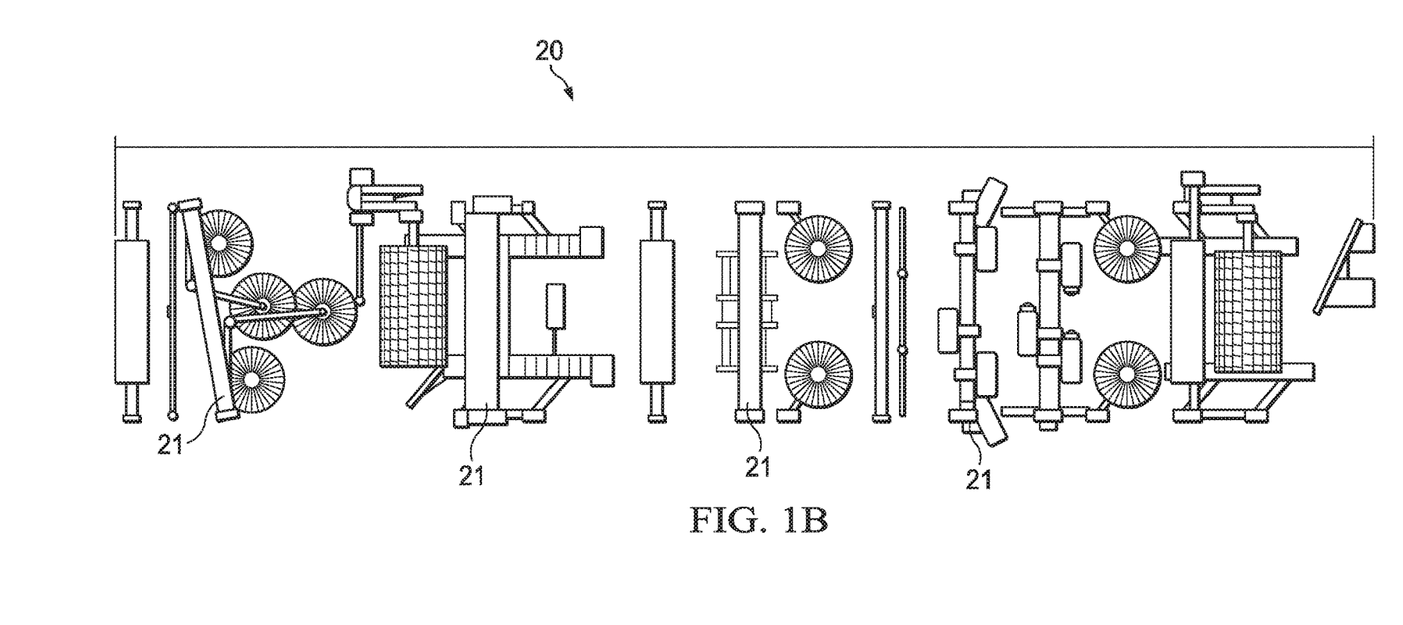
FIG. 1B is a schematic plan view of the vehicle wash system of FIG. 1A.
Figure 2:
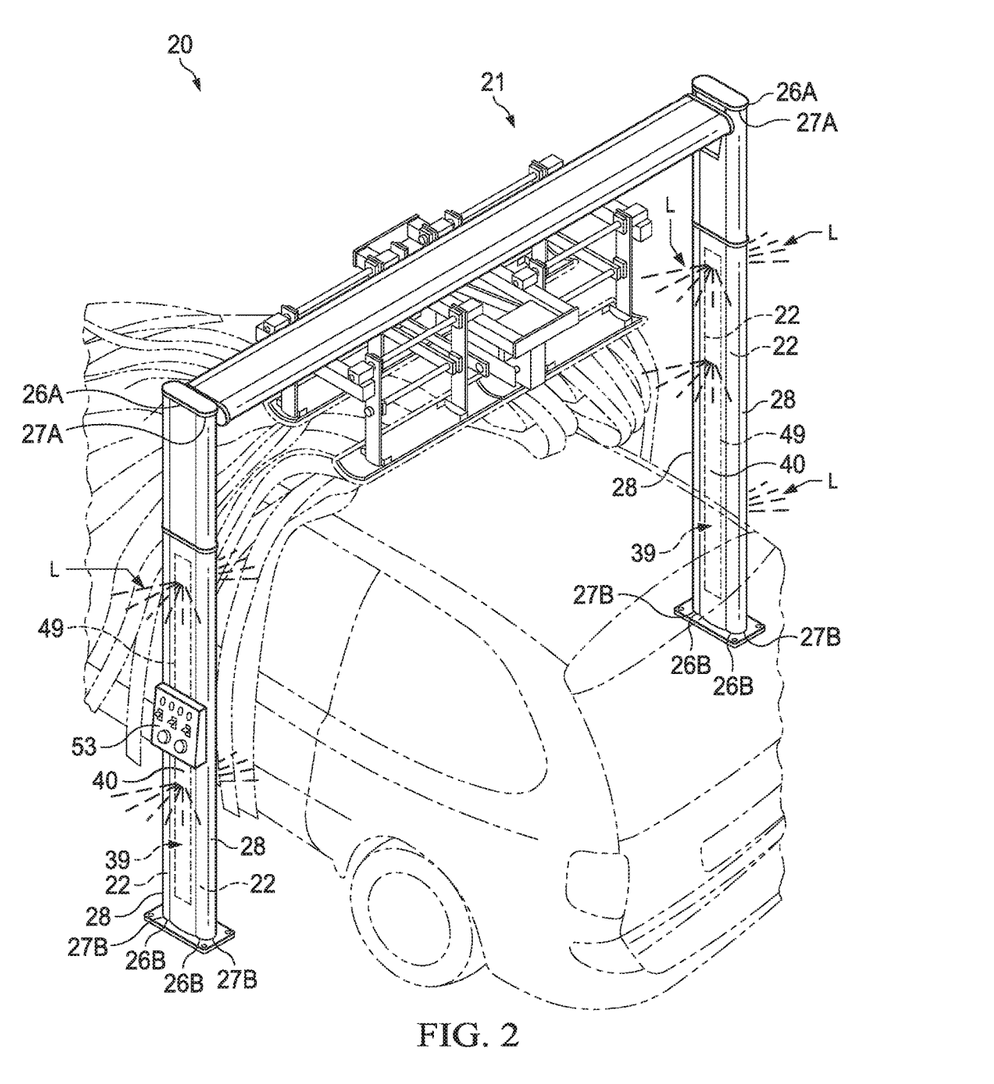
FIG. 2 is a partial perspective view of an exemplary component applied to a vehicle, including a pair lighting devices, each supported by a respective pair of support members.
Figure 3:
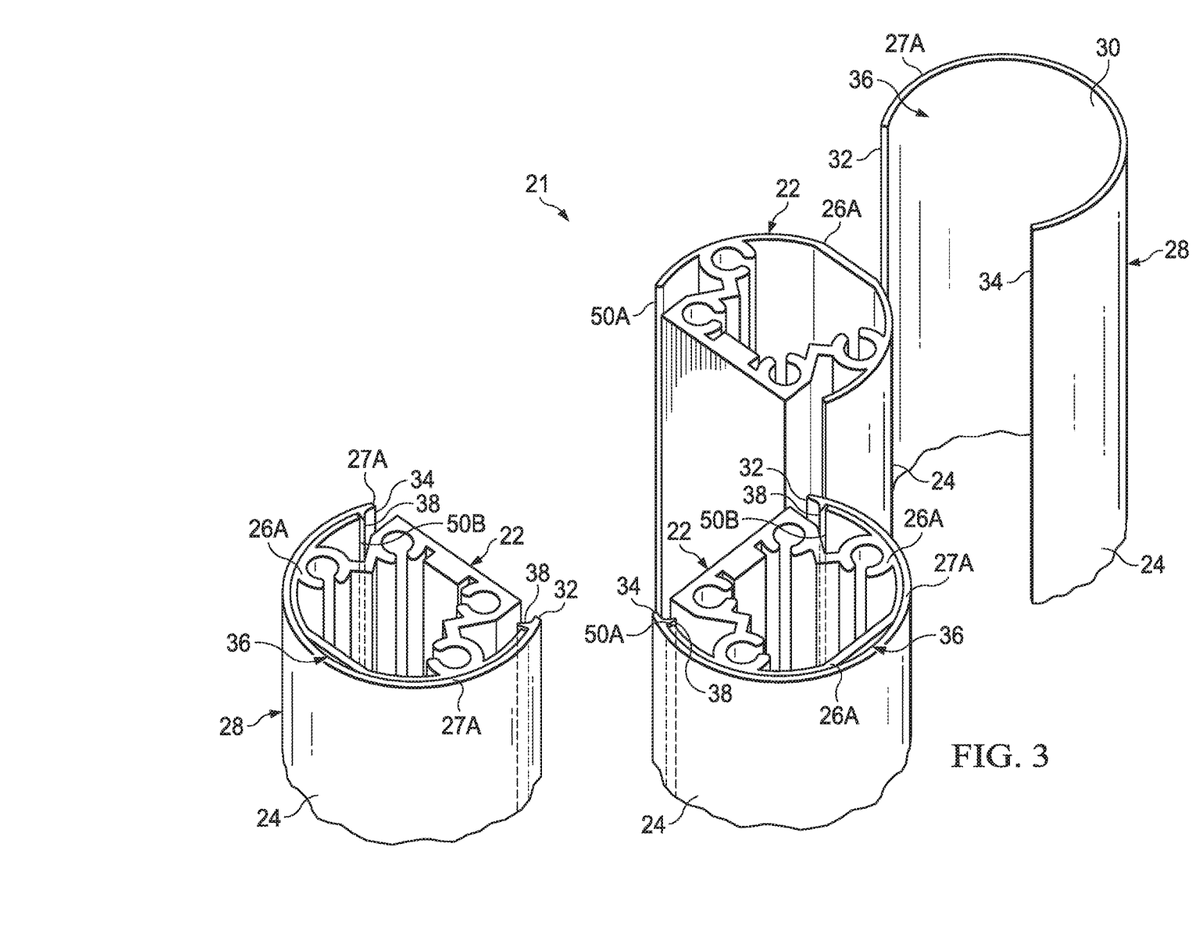
FIG. 3 is a partial perspective and exploded view of support members and cover members for at least partially covering the respective support member.
Figure 6A:
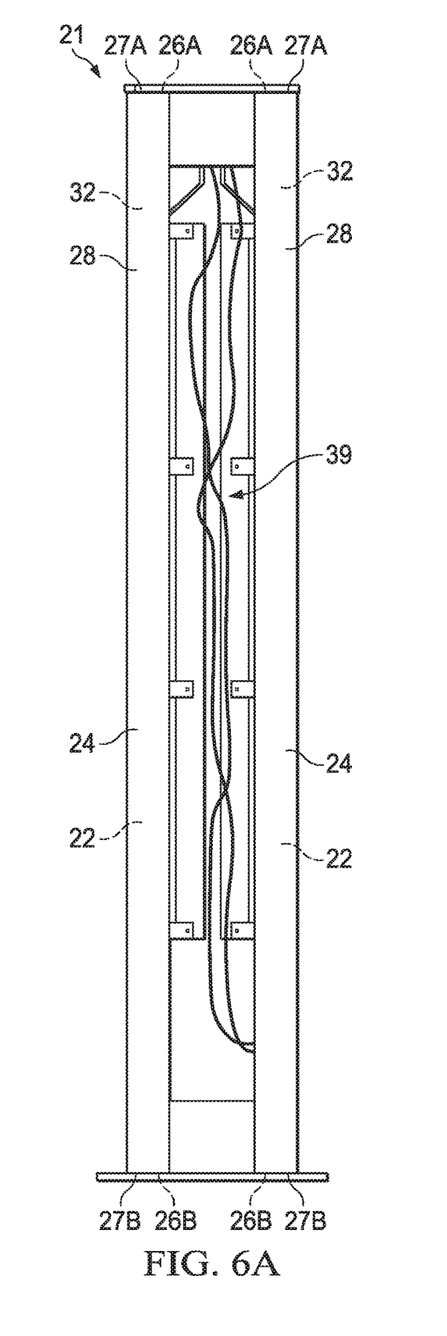
FIG. 6A is a schematic side view of a pair of support members disposed in spaced relationship to define an area therebetween.
Figure 6B:
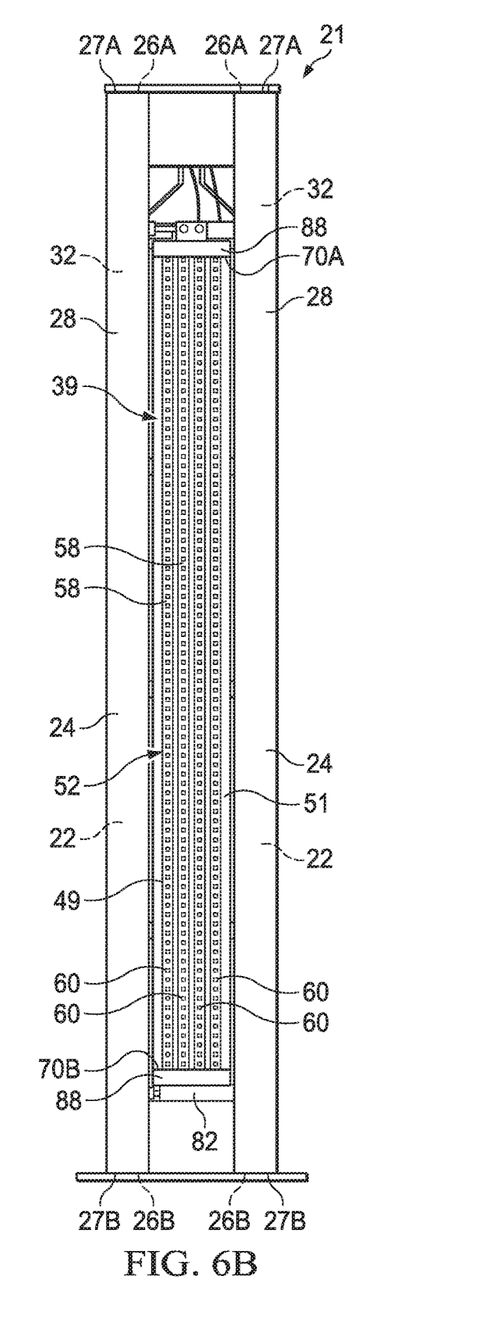
FIG. 6B is a schematic side view of the pair of support members of FIG. 6A with a lighting device operatively disposed therebetween, wherein the lighting device includes a plurality of light emitting diodes (LEDs)
Figure 6C:
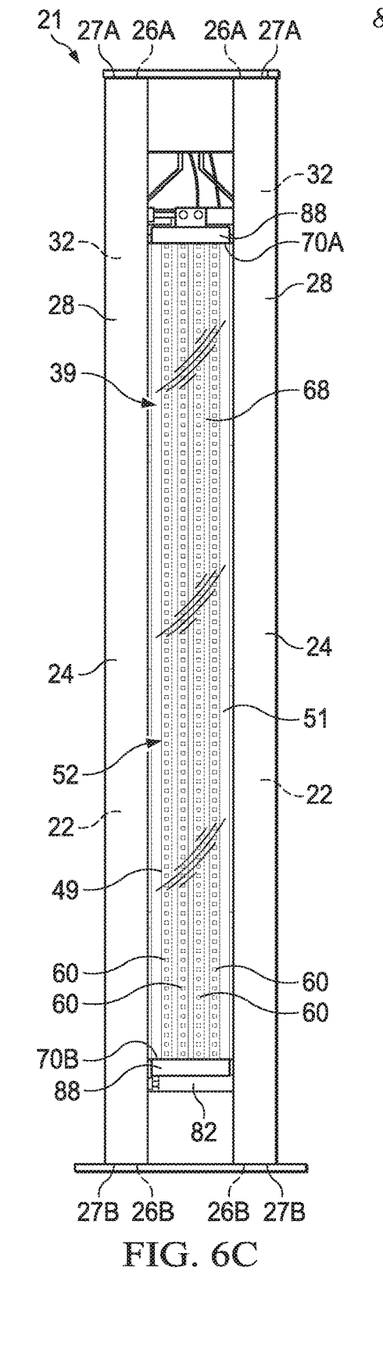
FIG. 6C is a schematic side view of the pair of support members of FIGS. 6A and 6B with the lighting device further including a lens covering the LEDs of the lighting device.
Figure 6D:
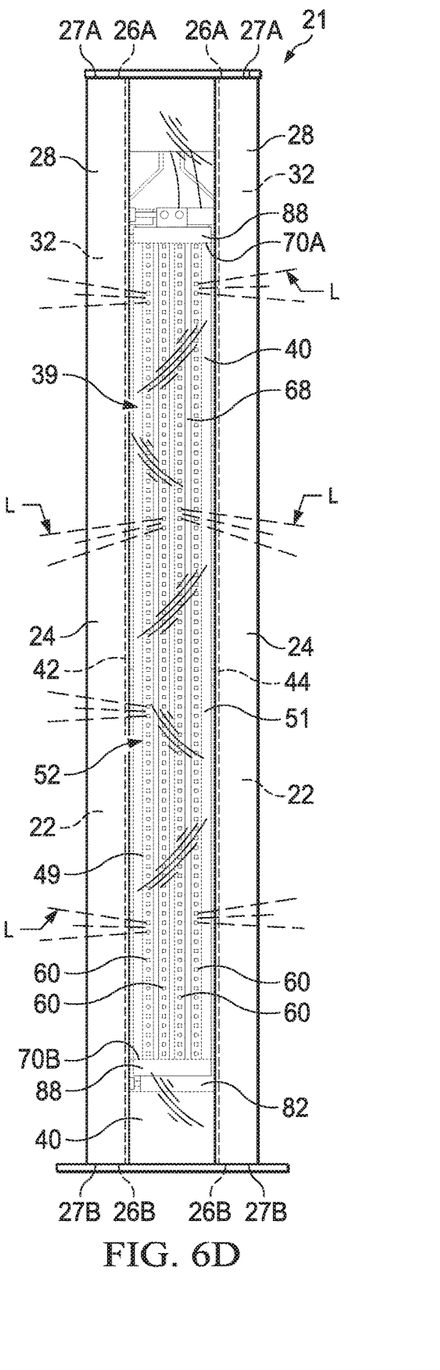
FIG. 6D is a schematic side view of the pair of support members of FIGS. 6A-6C, with the panel member operatively attached to the pair of support members and covering the lighting device, with illumination from the LEDs of the lighting device being reflected through the lens and the cover member.

The LED assembly 52 may be an LED strip light that includes the plurality of LEDs 60 that are arranged in single file, i.e., generally linearly, as generally illustrated in FIGS. 6B-6D. It should be appreciated that the lighting device 49 may include more than one LED assembly 52, such as a plurality of LED strip lights arranged in relationship to one another. In another aspect of the disclosure, the LED assembly 52 may include an LED panel light having the plurality of LEDs 60 arranged in an array having at least two columns of LEDs 60 or arranged in any other desired pattern of LEDs 60. In one embodiment, the LED assembly 52 is operatively attached to the mounting plate 51 such that the LEDs 60 form a plurality of columns. With reference to the exemplary embodiment, shown in FIGS. 6A-6D, four columns are shown as extend longitudinally. It should be appreciated that the LEDs may be arranged in any pattern to provide the desired illumination and display. When energized, each LED 60 projects a field of light L therefrom, as is known to those of skill in the art. The LED assembly 52 may be arranged and oriented such that the field of light L projected from the LEDs 60 associated with each column is projected radially away from the LEDs 60 associated with the other columns, as schematically illustrated in FIGS. 2, 4, and 6D.

Referring again to FIGS. 4 and 6C-6D, the LED assembly 52 may include a lens 68 that is operatively attached to the mounting plate 51. Each LED 60 is operatively disposed between the mounting plate 51 and the lens 68. The lens 68 is configured such that the field of light L projected from each of the plurality of LEDs 60 passes therethrough. The lens 68 may be constructed of a translucent material. It should be appreciated that the lens 68 may be constructed of other materials, so long as at least a portion of the field of light L passes therethrough. In another exemplary embodiment, the lens may be opaque.

Once the lens 68 is attached to the mounting plate, as illustrated in FIGS. 4 and 6C-6D, the lens 68 presents a cross sectional shape that is a generally rounded arch. It should be appreciated that the lens 68 may form other cross sectional shapes as known to those of skill in the art.

Referring again to FIGS. 6B-6D, the mounting plate 51 extends longitudinally between a first plate end 70A and a second plate end 70B. The mounting plate 51 also extends laterally and circumferentially between a first plate edge 72A and a second plate edge 72B. The mounting plate 51 defines a first mounting channel 74A, proximate the first plate edge 72A, and a second mounting channel 74B, proximate the second plate edge 72B. The first and second mounting channels 74A, 74B extend in generally facing relationship to one another such that the first mounting channel 74A is defined between the first plate edge 72A and the first mounting surface 54 and the second mounting channel 74B is defined between the second plate edge 72B and the first mounting surface 54. The lens 68 extends laterally between a first lens edge 78A and a second lens edge 78B. The lens 68 may be flexible. As such, the lens 68 may be flexed such that the first lens edge 78A of the lens 68 is operatively disposed within the first mounting channel 74A and the second lens edge 78B of the lens 68 is operatively disposed within the second mounting channel 74B, such that the lens 68 is operatively attached to the mounting plate 51.

The lighting device 49 may also include a pair of end caps 88. The end caps 88 are secured to the mounting plate 51 in longitudinally spaced relationship to one another such that one of the end caps 88 is disposed proximate a respective first and second plate end 70A, 70B. The end caps 88 may define grooves or slots for receiving a respective end of the lens 68 therein. The grooves or slots may be shaped to match a cross sectional profile of the lens 68 when the lens 68 is received therein. In such a configuration, the lens 68 perimeter is encapsulated by a combination of the mounting channels 74A, 74B and the grooves of the end caps 88.

The lighting device 49 may further include a first attachment member 80 and a second attachment member 82. The first attachment member 80 may be operatively attached to the mounting plate 51, proximate the first plate end 70A, and the second attachment member 82 may be operatively attached to the mounting plate 51, proximate the second plate end 70B. It should be appreciated that the first and second attachment members 80, 82 are configured to operatively attach the lighting device to the component 21.

With reference to the embodiment of FIGS. 4 and 6A-6D, at least one of the attachment members 80, 82 operatively attaches the lighting device 49 to component 21 via a pair of support members 22. With specific reference to FIG. 4, each support member 22 presents an inner surface 84 extending longitudinally in spaced and facing relationship to one another. Once inserted into the open area 39, the first attachment member 80 and the second attachment member 82 each exerts a retention force against the inner surface 84 of each of the pair of support members 22 to operatively attach the lighting device 49 to the component 21.

The attachment members 80, 82 of the lighting device 49 may be configured such that the lighting device 49 is releasably engageable with the respective pair of support members 22. As such, the lighting device 49 may be configured to be installed in the area 39 between the support members 22 without having to drill any attachment holes. Thus, the lighting device 49 may be provided as a retrofit kit, as explained in more detail below.

Referring again to FIGS. 4 and 6D, once the lighting device 49 is operatively attached to the component 21, the panel member 40 is operatively attached to the support members 22. More specifically, the panel member 40 extends between the pair of support members 22 such that the panel member 40 may be releasably engageable one of the pair of support members 22 adjacent a first support edge and releasably engageable with the other one of the pair of support members 22 adjacent a second support edge 50B to at least partially cover the lighting device 49 disposed in the area 39. With continued reference to FIG. 4, more than one lighting device 49 may be operatively attached to the component 21, such that the LEDs 60 of the lighting devices 49 face away from one another. As such, there may be a first panel member 40A and a second panel member 40B that cover the respective lighting devices 49.

In another embodiment, the panel members 40 may be translucent in order to provide any desired amount of light to travel therethrough. Additionally, the panel members 40 may be flexible. The panel members 40 may be formed from any material to direct the light therethrough.

With continuing reference to FIG. 4, when each lighting device 49 is inserted into the area 39 defined between the support members 22, the lighting device 49 is disposed such that any hoses, wiring, or other elements disposed within the area are placed behind the lighting device 49 such that the lighting device 49 is disposed between the hoses, wiring, or other elements and the respective panel member 40. Placement of the lighting device 49 prevents the hoses, wiring, etc. are not in the path of the light produced by the LEDS 60 when the LEDs are energized to otherwise produce a shadow.

The retrofit kit may be provided for the purpose of retrofitting a vehicle component 21 to include the lighting device 49 having a plurality of the LEDs 60. As such, the retrofit kit allows an existing component 21 to be reconfigured to include at least one lighting device 49 therein. The retrofit kit may include, in part, a lighting device having at least one mounting plate 51, a plurality of the LEDs 60, a circuit board 58, and wiring for connection to a power supply and/or a controller 53.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

The invention claimed is:

1. A lighting device for attachment to a component defining an open area, the lighting device comprising:
   a mounting plate extending longitudinally, and configured to be operatively disposed within the open area;
   wherein the mounting plate presents a first mounting surface and a second mounting surface, opposite the first mounting surface;
   wherein the mounting plate extends longitudinally between a first plate end and a second plate end;
   wherein the mounting plate extends laterally between a first plate edge and a second plate edge;
   wherein the mounting plate defines a first mounting channel, proximate the first plate edge, and a second mounting channel, proximate the second plate edge;
   wherein the first and second mounting channels are in generally facing relationship to one another such that the first mounting channel is defined between the first plate edge and the first mounting surface and the second mounting channel is defined between the second plate edge and the first mounting surface;
   a light emitting diode (LED) assembly operatively attached to the first mounting surface, the LED assembly including:
   a plurality of LEDs operatively attached to the first mounting surface of the mounting plate, such that the plurality of LEDs form at least two columns;
   wherein each of the plurality of LEDs is configured to emit a respective field of light in response to being energized;
   wherein the LED assembly is configured such that a field of light projected from the plurality of LEDs for one of the at least two columns is projected radially away from the field of light projected from the other of the at least two columns; and
   a lens extending laterally between a first edge and a second edge;
   wherein the first edge of the lens is operatively disposed within the first mounting channel and the second edge of the lens is operatively disposed within the second mounting channel, such that the lens is operatively attached to the mounting plate with the plurality of LEDs operatively disposed between the mounting plate and the lens; and
   wherein the lens is configured such that the field of light projected from each of the plurality of LEDs passes therethrough.

2. The lighting device of claim 1, wherein the LED assembly further includes:
a circuit board including a first board surface and a second board surface, opposing the first board surface;
wherein the plurality of LEDs are operatively disposed on the first surface of the circuit board; and
wherein the LED assembly is operatively attached to the mounting plate such that the second board surface of the circuit board is disposed on the first mounting surface of the mounting plate.

3. The lighting device of claim 2, further comprising an adhesive material operatively disposed between the first mounting surface and the second board surface adhesively attach the circuit board to the mounting plate.

4. The lighting device of claim 2, wherein the circuit board is flexible.

5. The lighting device of claim 4, wherein the LED assembly is an LED strip light including the plurality of LEDs arranged in each of at least two adjacent columns, wherein each of the at least two adjacent columns is arranged in a single file.

6. The lighting device of claim 1, further comprising a first attachment member and a second attachment member;
wherein the first attachment member is operatively attached to the mounting plate, proximate the first plate end, and the second attachment member is operatively attached to the mounting plate, proximate the second plate end;
wherein the first and second attachment members are configured to operatively attach the lighting device to the component.

7. A component for a vehicle wash system, the component comprising:
a pair of support members operatively extending longitudinally in spaced relationship to one another, such that an area is defined therebetween; and
a lighting device operatively disposed in the area defined between the pair of support members, the lighting device including:
a mounting plate extending longitudinally;
wherein the mounting plate presents a first mounting surface and a second mounting surface, opposite the first mounting surface;
wherein the mounting plate extends longitudinally between a first plate end and a second plate end;
wherein the mounting plate extends laterally between a first plate edge and a second plate edge;
wherein the mounting plate defines a first mounting channel, proximate the first plate edge, and a second mounting channel, proximate the second plate edge;
wherein the first and second mounting channels are in generally facing relationship to one another such that the first mounting channel is defined between the first plate edge and the first mounting surface and the second mounting channel is defined between the second plate edge and the first mounting surface;
a light emitting diode (LED) assembly operatively attached to the first mounting surface, the LED assembly including:
a plurality of LEDs operatively attached to the first mounting surface of the mounting plate, such that the plurality of LEDs form at least two columns;
wherein each one of the plurality of LEDs is configured to emit a respective field of light in response to being energized;
wherein the LED assembly is configured such that a field of light projected from the plurality of LEDs for one of the at least two columns is projected radially away from the field of light projected for the other of the at least two columns; and
a lens extending laterally between a first edge and a second edge;
wherein the first edge of the lens is operatively disposed within the first mounting channel and the second edge of the lens is operatively disposed within the second mounting channel, such that the lens is operatively attached to the mounting plate with the plurality of LEDs operatively disposed between the mounting plate and the lens;
wherein the lens presents a cross sectional shape that is a rounded arch when the lens is operatively attached to the mounting plate; and
wherein the lens is configured such that the field of light projected from each one of the plurality of LEDs passes therethrough.

8. The component of claim 7, wherein the LED assembly includes:
a circuit board including a first board surface and a second board surface, opposing the first board surface;
wherein the plurality of LEDs are operatively disposed on the first surface of the circuit board; and
wherein the LED assembly is operatively attached to the mounting plate such that the second surface of the circuit board is disposed on the first mounting surface of the mounting plate.

9. The component of claim 7, wherein the circuit board is flexible.

10. The component of claim 7, wherein the LED assembly is an LED strip light arranged in at least two adjacent columns, wherein each one of the at least two columns is arranged in single file order.

11. The component of claim 7, further including a first attachment member and a second attachment member;
wherein the first attachment member is operatively attached to the mounting plate, proximate the first plate end, and the second attachment member is operatively attached to the mounting plate, proximate the second plate end; and
wherein the first and second attachment members operatively attach the lighting device to the component.

12. The component of claim 11, wherein each one of the pair of support members present an inner surface extending longitudinally in spaced and facing relationship to one another;
wherein the first attachment member exerts a retention force against the inner surface of each one of the pair of support members to operatively attach the lighting device to the component.

13. The component of claim 12, wherein the first and second attachment members each exert a respective retention force against the inner surface of each one of the pair of support members to operatively attach the lighting device to the component.

14. The component of claim 12, wherein the lighting device is releasably engageable with the pair of support members.

15. The component of claim 12, further comprising a first panel member extending between the pair of support members;
wherein the first panel member is releasably engageable with one of the pair of support members adjacent a first support edge and is releasably engageable with the other one of the pair of support members adjacent a second support edge to at least partially cover the lighting device disposed in the area; and a second panel member extending between the pair of support members, in spaced and opposing relationship to the first panel member;

wherein the second panel member releasably engages one of the pair of support members adjacent a first support edge and engages the other one of the pair of support members adjacent a second support edge to at least partially cover the lighting device disposed in the area; and wherein the lighting device is sandwiched between the first panel member and the second panel member.

16. A retrofit kit for a component including a pair of support members defining an open area therebetween, the retrofit kit comprising:

a mounting plate extending longitudinally, and configured to be operatively disposed within the open area;

wherein the mounting plate presents a first mounting surface and a second mounting surface, opposite the first mounting surface;

wherein the mounting plate extends longitudinally between a first plate end and a second plate end;

wherein the mounting plate extends laterally between a first plate edge and a second plate edge;

wherein the mounting plate defines a first mounting channel, proximate the first plate edge, and a second mounting channel, proximate the second plate edge;

wherein the first and second mounting channels are in generally facing relationship to one another such that the first mounting channel is defined between the first plate edge and the first mounting surface and the second mounting channel is defined between the second plate edge and the first mounting surface;

a light emitting diode (LED) assembly operatively attachable to the first mounting surface, the LED assembly including a plurality of LEDs;

wherein the LED assembly is configured to be operatively attached to the mounting plate such that the second surface of the LED assembly is disposed on the mounting plate, such that the plurality of LEDs form at least two columns;

wherein each one of the plurality of LEDs is configured to emit a respective field of light in response to being energized; and wherein the LED assembly is configured such that a field of light projected from the plurality of LEDs for one of the at least two columns is projected radially away from the field of light projected from the other of the at least two columns; and a lens extending laterally between a first edge and a second edge;

wherein the first edge of the lens is configured to be operatively disposed within the first mounting channel and the second edge of the lens is configured to be operatively disposed within the second mounting channel with the plurality of LEDs operatively disposed between the mounting plate and the lens to operatively attach the lens to the mounting plate;

wherein the lens is configured to present a cross sectional shape that is a rounded arch when the lens is operatively attached to the mounting plate; and wherein the lens is configured such that the field of light projected from each one of the plurality of LEDs passes therethrough when the lens is operatively attached to the mounting plate.

* * * * *